… …

United States Patent

Nakakita et al.

[11] Patent Number: 6,116,704
[45] Date of Patent: Sep. 12, 2000

[54] REGENERATIVE BRAKING APPARATUS FOR BATTERY VEHICLE

[75] Inventors: Osamu Nakakita; Kazuya Fukuda, both of Sagamihara, Japan

[73] Assignee: Mitsubishi Heavy Industries, Ltd., Tokyo, Japan

[21] Appl. No.: 09/257,193

[22] Filed: Feb. 25, 1999

[30] Foreign Application Priority Data

Aug. 24, 1998 [JP] Japan .................................. 10-237734

[51] Int. Cl.⁷ ..................................................... B60K 1/00
[52] U.S. Cl. ........................................... 303/152; 180/65.1
[58] Field of Search ............................ 303/152; 180/192, 180/6.5, 65.1, 6.28; 318/258, 139

[56] References Cited

U.S. PATENT DOCUMENTS

| | | | |
|---|---|---|---|
| 3,732,751 | 5/1973 | Berman et al. ............................ | 74/675 |
| 4,049,998 | 9/1977 | Boxer ...................................... | 318/258 |
| 4,388,537 | 6/1983 | Horiuchi et al. ........................ | 318/376 |
| 4,409,525 | 10/1983 | Hartwig .................................. | 318/139 |
| 4,951,769 | 8/1990 | Kawamura .............................. | 180/65.4 |
| 5,363,937 | 11/1994 | James ...................................... | 180/192 |
| 5,549,172 | 8/1996 | Mutoh et al. .......................... | 180/65.1 |
| 5,878,360 | 3/1999 | Nishino et al. .......................... | 701/41 |

*Primary Examiner*—Matthew C. Graham
*Assistant Examiner*—Jeffrey Woller
*Attorney, Agent, or Firm*—Oblon, Spivak, McClelland, Maier & Neustadt, P.C.

[57] ABSTRACT

A regenerative braking apparatus for a battery operated vehicle includes rotation direction detection devices for detecting the rotation directions of respective axles of two front wheels, a current direction judgment device for judging respective field current directions of two propulsion motors based on respective outputs from the rotation direction detection devices, and a current direction control device for controlling the field current direction of the propulsion motors based on the output from the current direction judgment device. In this way, even when close to the steering angle for inner wheel stop turning, concern for external action rotation of the propulsion motor for driving the inner wheel is eliminated, enabling control of regeneration at the time of turning to be carried out with good efficiency.

4 Claims, 4 Drawing Sheets

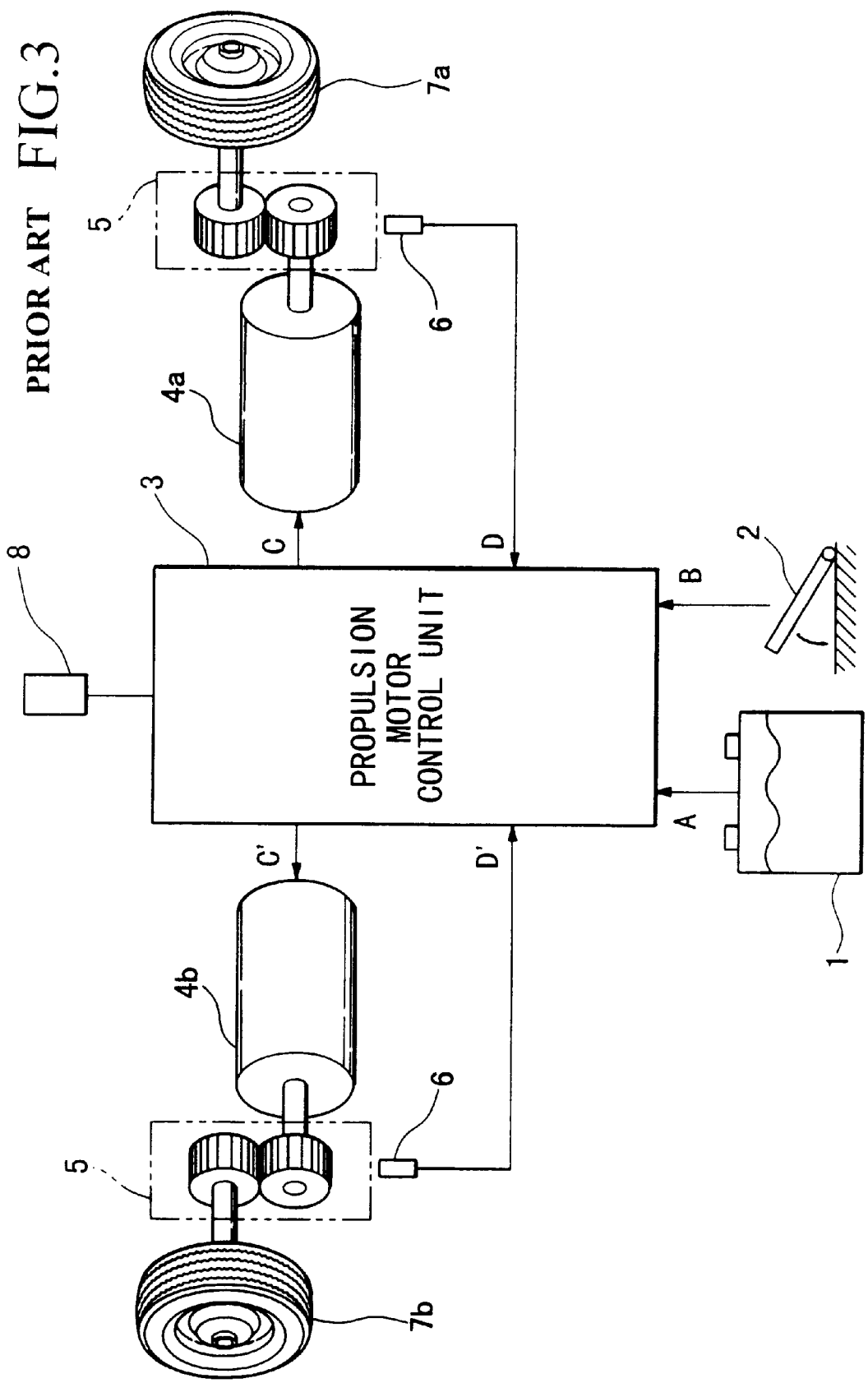

PRIOR ART FIG.4
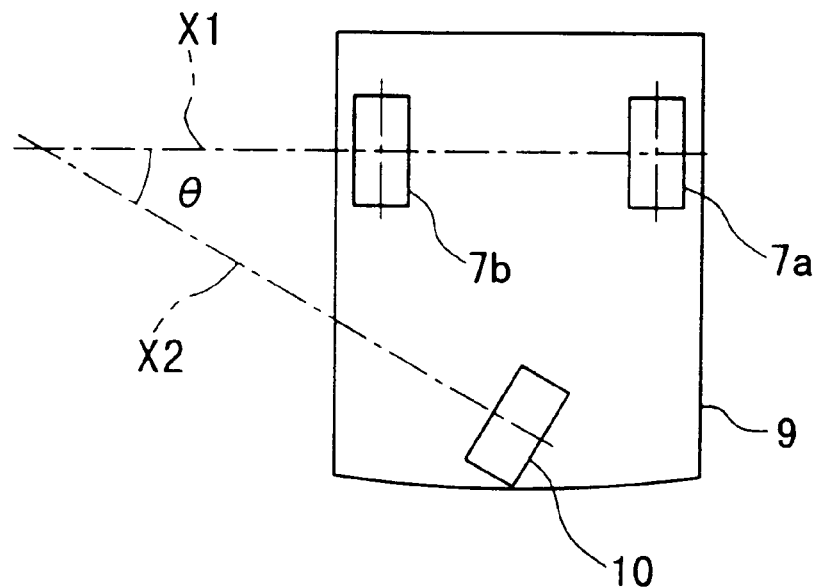
FIG.5
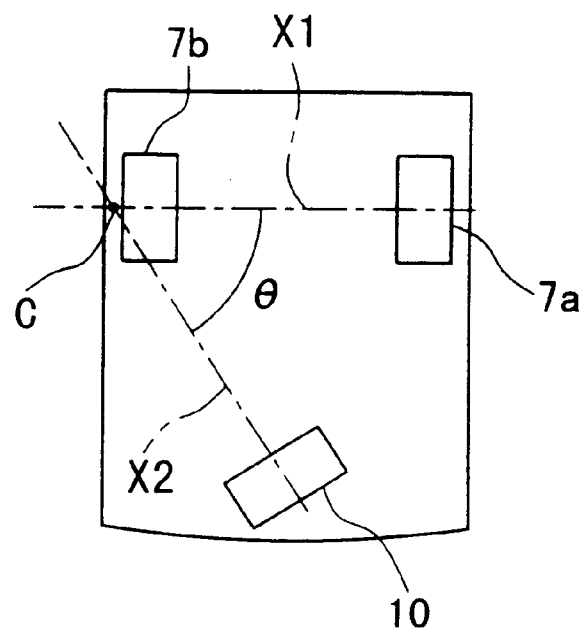

REGENERATIVE BRAKING APPARATUS FOR BATTERY VEHICLE

BACKGROUND OF THE INVENTION

1. Field of the Invention

The present invention relates to a regenerative braking apparatus for a battery operated vehicle, which is ideally used for control at the time of regenerative braking of a propulsion motor of a battery operated forklift to reduce the motion that an inner wheel is moved by a truck locus at the time of regeneration close to the steering angle for inside wheel stop turning.

2. Description of the Related Art

Heretofore, forklifts equipped with a battery as a power source and propelled by a motor supplied from the battery, as the drive source, are known.

FIG. 3 is a schematic diagram illustrating a three wheeled battery operated forklift with two propulsion motors to which is applied a conventional regenerative braking apparatus. In FIG. 3, numeral 1 denotes a battery, 2 an accelerator, 3 a propulsion motor control unit, 4a and 4b propulsion motors, 5 transmission units, 6 rotation sensors for detecting the rotational speed of the propulsion motors, 7a an outer wheel (when turning) of two front wheels of the forklift, 7b an inner wheel (when turning) of the two front wheels of the forklift, and 8 a steering angle sensor.

The steering angle sensor 8 is a sensor for detecting a steering angle θ as shown in FIG. 4, subtended between an axis X1 common with the outer wheel 7a and inner wheel 7b of the forklift 9, and an axis X2 of a rear wheel 10.

With this forklift 9, the steering angle θ subtended between the axis X1 common with the outer wheel 7a and inner wheel 7b, and the axis X2 of the rear wheel 10, is detected by the steering angle sensor 8. Then, as seen in FIG. 3, by means of the propulsion motor control unit 3, regeneration circuits for each of the outer wheel 7a and the inner wheel 7b are switched corresponding to the steering angle θ.

By respectively controlling the propulsion motor 4a of the outer wheel 7a and the propulsion motor 4b of the inner wheel 7b in this way, then in the case where the intersection point of the axis X1 and the axis X2 is outside of the forklift 9, the propulsion motor 4a and the propulsion motor 4b are made to act together as regenerative brakes in the forward direction or the reverse direction, to thereby effect regenerative braking. Furthermore, in the case of turning with the intersection point of the axis X1 and the axis X2 inside of the forklift 9 (between the outer wheel 7a and the inner wheel 7b), then the propulsion motor 4a can be made to act as a regenerative brake in the forward direction, and the propulsion motor 4b as a regenerative brake in the reverse direction, or the propulsion motor 4a can be made to act as a regenerative brake in the reverse direction and the propulsion motor 4b as a regenerative brake in the forward direction.

With the conventional forklift described above, in the case where the steering angle θ is small, there is no particular concern of a problem occurring.

However, in the case where the rear wheel 10 is turned by a large amount, as shown in FIG. 5, the intersection point C of the axis X1 and the axis X2 becomes very close to the inner wheel 7b, and there is the situation where the steering angle θ is substantially the same as that for inner wheel stop turning. In this case there is the problem that regenerative braking cannot be properly applied to the propulsion motor of the inner wheel 7b, since the propulsion motor is rotated by the action of the outer wheel 7a, as the motion that the inner wheel 7b is moved by a truck locus.

In the case where the propulsion motor 4b of FIG. 3 is rotated by external action, the situation arises where the regenerative direction of the inner wheel 7b differs from the drive direction, so that an optimum circuit current does not flow in the propulsion motor 4b, and sufficient regenerative braking is not obtained.

This phenomena appears noticeably at the time of regeneration close to the inner wheel stop turning.

The present invention takes into consideration the above situation, with the object of providing a regenerative braking apparatus for a battery operated vehicle, which can effect control of regeneration with good efficiency at the time of turning, without the concern of the motion that an inside wheel propulsion motor is rotated by a truck locus, even when close to the steering angle for inner wheel stop turning.

SUMMARY OF THE INVENTION

To address the above problem, the present invention provides the following regenerative braking apparatus for a battery operated vehicle.

That is to say, the regenerative braking apparatus for a vehicle according to the present invention is characterized in that, with a battery as a power source, which controls the regeneration direction at the time of regenerative braking of two propulsion motors respectively provided for two front wheels, for individually driving the front wheels, there is provided a rotation direction detection device for detecting the rotation directions of respective axles of the two front wheels, a current direction judgment device for judging respective field current directions of the two propulsion motors based on an output from the rotation direction detection device, and a current direction control device for controlling the field current directions of the propulsion motors based on an output from the current direction judgment device.

With the regenerative braking apparatus for a battery operated vehicle according to the present invention, there is provided the rotation direction detection device for detecting the rotation directions of the respective axles of the two front wheels, the current direction judgment device for judging the respective field current directions of the two propulsion motors, based on the output from the rotation direction detection device, and the current direction control device for controlling the field current directions of the propulsion motors based on the output from the current direction judgment device. Therefore, by controlling the field current directions of the propulsion motors corresponding to the rotation directions of their shafts, an optimum regenerative braking can be applied to the propulsion motor which is to be subjected to regenerative braking, so that even at the time of regeneration close to inner wheel stop turning, a field current in the appropriate direction can be made to flow in the propulsion motor, enabling sufficient regenerative braking to be obtained at the time of turning.

Consequently, even when close to the steering angle for inner wheel stop turning, the heretofore problem of the concern of the motion that the inside wheel propulsion motor is rotated by a truck locus is eliminated, enabling control of regeneration at the time of turning to be carried out with good efficiency.

BRIEF DESCRIPTION OF THE DRAWINGS

FIG. 3 is schematic diagram showing a conventional three wheeled battery operated forklift with two propulsion motors.

FIG. 4 is a bottom surface view illustrating the positional relation between the front wheels and rear wheel of a conventional forklift.

FIG. 5 is a bottom surface view illustrating the positional relation between the front wheels and rear wheel close to a steering angle for inner wheel stop turning.

DESCRIPTION OF THE PREFERRED EMBODIMENT

An embodiment of a regenerative braking apparatus for a battery operated vehicle of the present invention will now be described with reference to the drawings.

Figure 1:
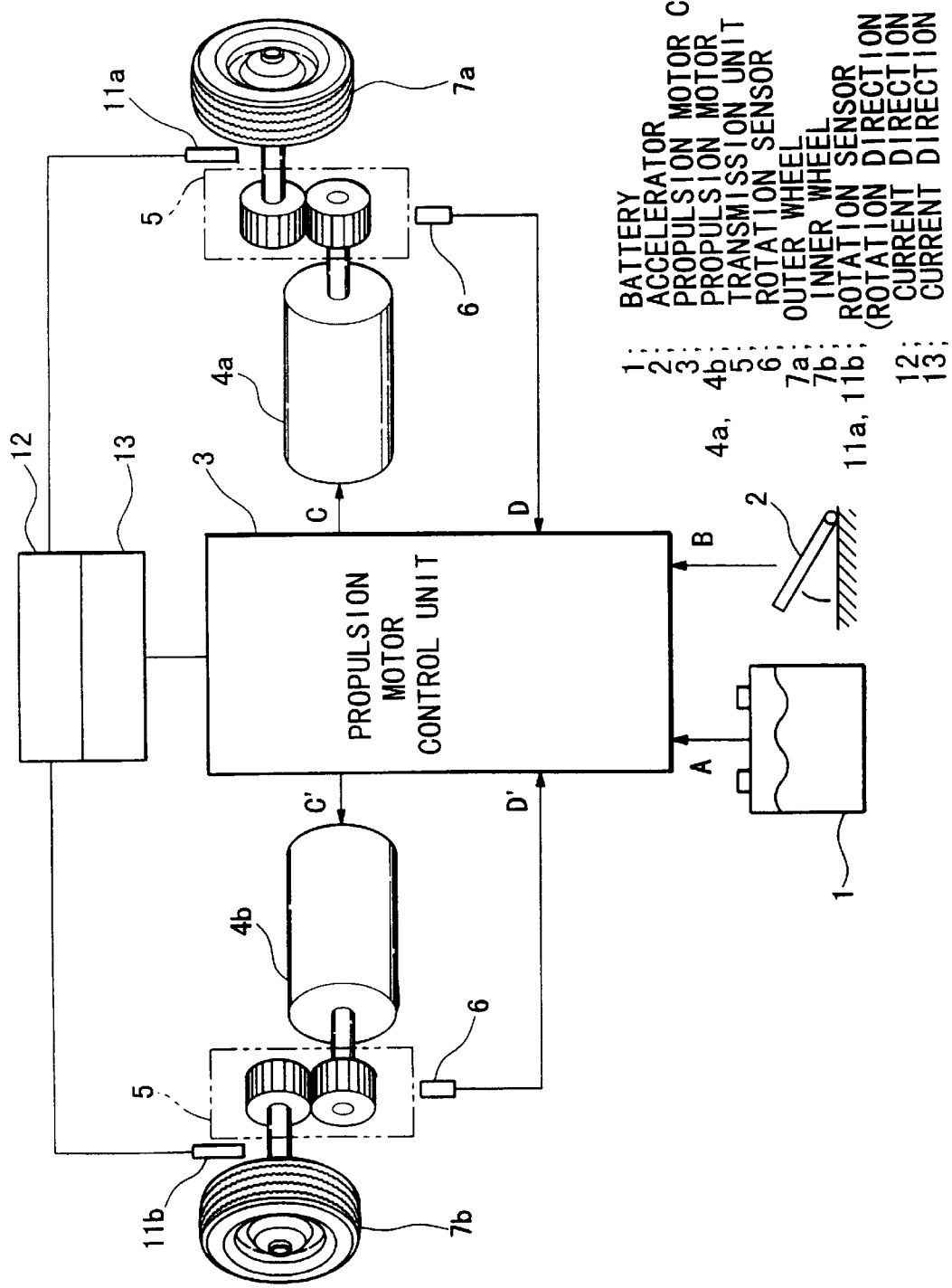
FIG. 1 is a schematic diagram showing a three wheeled battery operated forklift with two propulsion motors, according to an embodiment of the present invention.
Figure 2:
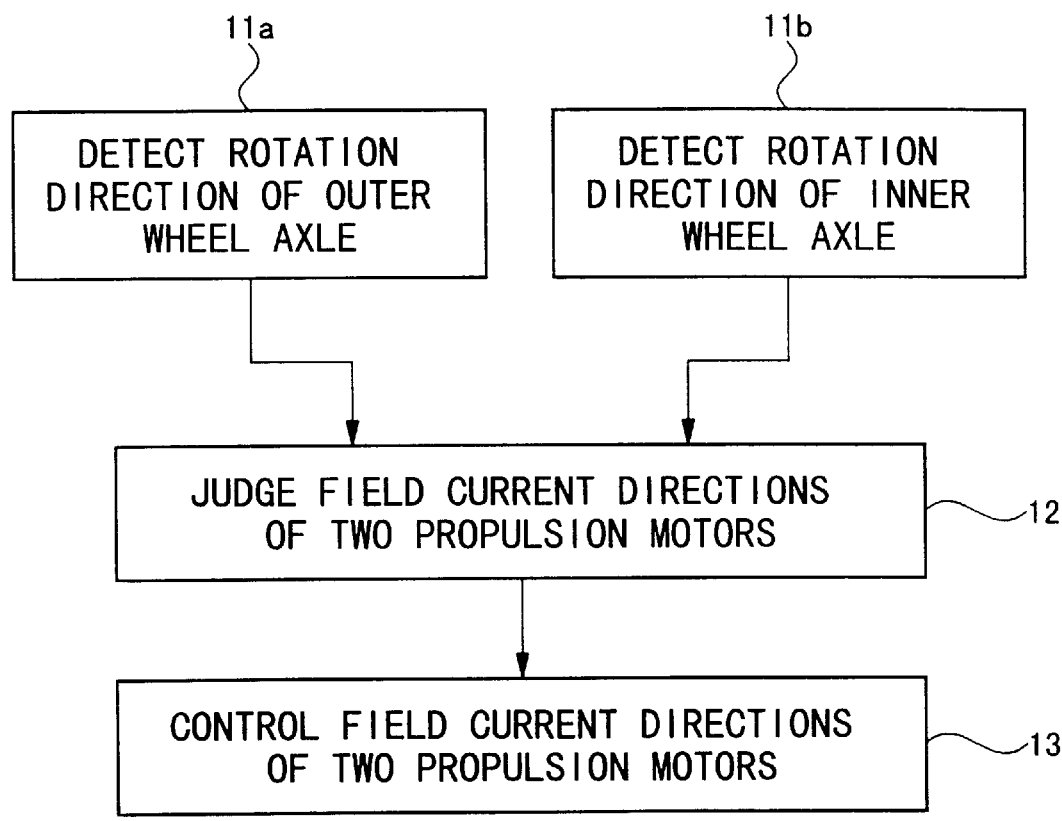
FIG. 2 is a flow chart illustrating the operation of a regenerative braking apparatus for a forklift of the embodiment of the present invention.

FIG. 1 is a schematic diagram showing a forklift with two propulsion motors, according to the embodiment of the present invention, while FIG. 2 is a flow chart illustrating the operation of a regenerative braking apparatus for the forklift.

The point where the construction of this forklift differs from the construction of the above-mentioned conventional forklift is that, with the conventional forklift, the steering angle sensor 8 is provided in the propulsion motor control unit 3, whereas with the forklift of the present embodiment, there is provided a rotation sensor 11a (rotation direction detection device) for detecting the axle rotation direction of the outer wheel 7a, and a rotation sensor 11b (rotation direction detection device) for detecting the axle rotation direction of the inside wheel 7b. Moreover, in the propulsion motor control unit 3, there is provided a current direction judgment section 12 for judging the direction of the respective field currents of the two propulsion motors 4a, 4b based on the output from the rotation sensors 11a, 11b, and a current direction control section 13 for controlling the respective field current directions of the propulsion motors 4a, 4b based on the output from the current direction judgment section 12.

With this regenerative braking apparatus, as shown in FIG. 2, at the time of regeneration, the rotation direction of the axle of the outer wheel is detected by the rotation sensor 11a, and the rotation direction of the axle of the inner wheel is detected by the rotation sensor 11b. Next, the respective field current directions of the two propulsion motors are judged based on the respective outputs from the rotation sensors 11a, 11b. Then, the respective field current directions of the two propulsion motors are controlled by the current direction control section 13 based on the output from the current direction judgment section 12.

In this way, as shown in FIG. 1, by controlling the respective field current directions of the two propulsion motors 4a, 4b in accordance with the rotation direction of their axles, then optimum regenerative braking can be applied to the propulsion motor 4b of the inner wheel 7b. As a result, even at the time of regeneration close to inner wheel stop turning, a field current in the appropriate direction flows in the propulsion motor 4b which rotates the axle of the inner wheel 7b, so that the propulsion motor 4b is operated as a regenerative brake, thus achieving adequate regenerative braking at the time of turning. Consequently, it is possible to reduce the heretofore motion that the inner wheel is moved by a truck locus produced close to the steering angle for inner wheel stop turning, so that regenerative control at the time of turning can be efficiently performed.

As described above, with the present embodiment, the rotation sensor 11a is provided for the axle of the outer wheel 7a and the rotation sensor 11b is provided for the axle of the inner wheel 7b. Moreover, in the propulsion motor control unit 3, there is provided the current direction judgment section 12 for judging the direction of the respective field currents of the two propulsion motors 4a, 4b based on the output from the rotation sensors 11a, 11b, and the current direction control section 13 for controlling the respective field current directions of the propulsion motors 4a, 4b based on the output from the current direction judgment section 12. Therefore, the respective field current directions of the propulsion motors 4a, 4b can be controlled corresponding to the rotation direction of their shafts, enabling optimum regenerative braking to be applied to the propulsion motor 4a (or the propulsion motor 4b). Consequently, even at the time of regeneration close to inner wheel stop turning, by passing a field current in the appropriate direction through the propulsion motor 4a (or the propulsion motor 4b), then sufficient regenerative braking can be obtained at the time of turning, enabling regenerative braking at the time of turning to be efficiently performed.

In the above, one embodiment of a regenerative braking apparatus for a battery operated vehicle according to the present invention has been described, based on the drawings. However, the specific construction is not limited to this embodiment, and designs and modifications within a scope not deviating from the gist of the invention are also possible.

For example, instead of the rotation sensors 11a, 11b, rotation direction detectors or tachometer generators may be provided for detecting the respective regeneration directions (the directions opposite to the driving directions) of the propulsion motors 4a, 4b, by detecting the potential difference between respective opposite terminals of the propulsion motors 4a, 4b. With these arrangements also, the same effect as with the rotation sensors 11a, 11b can be obtained.

Furthermore, the current direction judgment section 12 and the current direction control section 13 may be combined together into a single construction.

What is claimed is:

1. A regenerative braking apparatus for a battery operated vehicle with a battery as a power source, which controls the regeneration direction at the time of regenerative braking of two propulsion motors respectively provided for two front wheels, for individually driving the front wheels, said apparatus comprising:

rotation direction detection devices for detecting the rotation directions of respective axles of said two front wheels;

a current direction judgment section for judging respective field current directions of said two propulsion motors based on an output from said rotation direction detection devices; and a current direction control section for controlling the field current directions of said propulsion motors based on an output from said current direction judgment section;

wherein said rotation direction detection devices are provided for each axle of said two front wheels, and the field current directions of said propulsion motors are controlled based on the output from these rotation direction detection devices.

2. A regenerative braking apparatus for a battery operated vehicle according to claim 1, wherein said rotation direction detection devices are rotation sensors.

3. A regenerative braking apparatus for a battery operated vehicle according to claim 1, wherein said rotation direction detection devices are rotation direction detectors for detecting regeneration direction from a potential difference between opposite terminals of said propulsion motors.

4. A regenerative braking apparatus for a battery operated vehicle according to claim 1, wherein said rotation direction detection devices are tachometer generators.

* * * * *